United States Patent [19]

Arp

[11] 4,141,493

[45] Feb. 27, 1979

[54] CONTAINER AND APPARATUS HAVING A SENSOR FOR RETURN DEPOSIT PAYOUT OF SUCH CONTAINER

[76] Inventor: Ewald A. Arp, 15910 Cedar Ridge Rd., Hopkins, Minn. 55343

[21] Appl. No.: 815,238

[22] Filed: Jul. 13, 1977

Related U.S. Application Data

[63] Continuation-in-part of Ser. No. 742,662, Nov. 17, 1976, abandoned.

[51] Int. Cl.[2] .......................... G06K 7/04; B67B 3/26; B07C 5/342

[52] U.S. Cl. .................................... 235/448; 209/567; 100/53; 194/4 R

[58] Field of Search ..................... 100/DIG. 2, 53, 99, 100/215–218; 209/80–88, 73, 74; 235/464, 467, 448, 485, 483, 490, 486; 206/179, 176, 168; 53/266, 267, 268, 270; 194/4 C, 97 A; 340/259; 356/240

[56] References Cited

U.S. PATENT DOCUMENTS

| | | | |
|---|---|---|---|
| 3,171,020 | 2/1965 | Lord | 235/448 |
| 3,585,367 | 6/1971 | Humbarger | 235/464 |
| 3,745,314 | 7/1973 | Mathias | 235/470 |
| 3,781,798 | 12/1973 | Hinks | 235/448 |
| 3,792,765 | 2/1974 | Arp | 100/DIG. 2 |
| 3,836,755 | 9/1974 | Ehrat | 235/448 |
| 3,923,158 | 12/1975 | Fornaa | 209/75 |
| 3,991,883 | 11/1976 | Hobler | 209/73 |

*Primary Examiner*—Robert M. Kilgore
*Attorney, Agent, or Firm*—Nickolas E. Westman

[57] ABSTRACT

Containers and an apparatus for sensing containers such as beverage cans, which cans include means for identifying the beverage cans on which a return payment is to be made. The containers on which a deposit is made will be identified in a particular way to indicate that upon return a return payment is to be made. The present device provides an automatic, individual container sensing unit used as shown in combination with a crushing device for sensing whether the can is proper for repayment, and crushing the container subsequent to proper identification.

29 Claims, 17 Drawing Figures

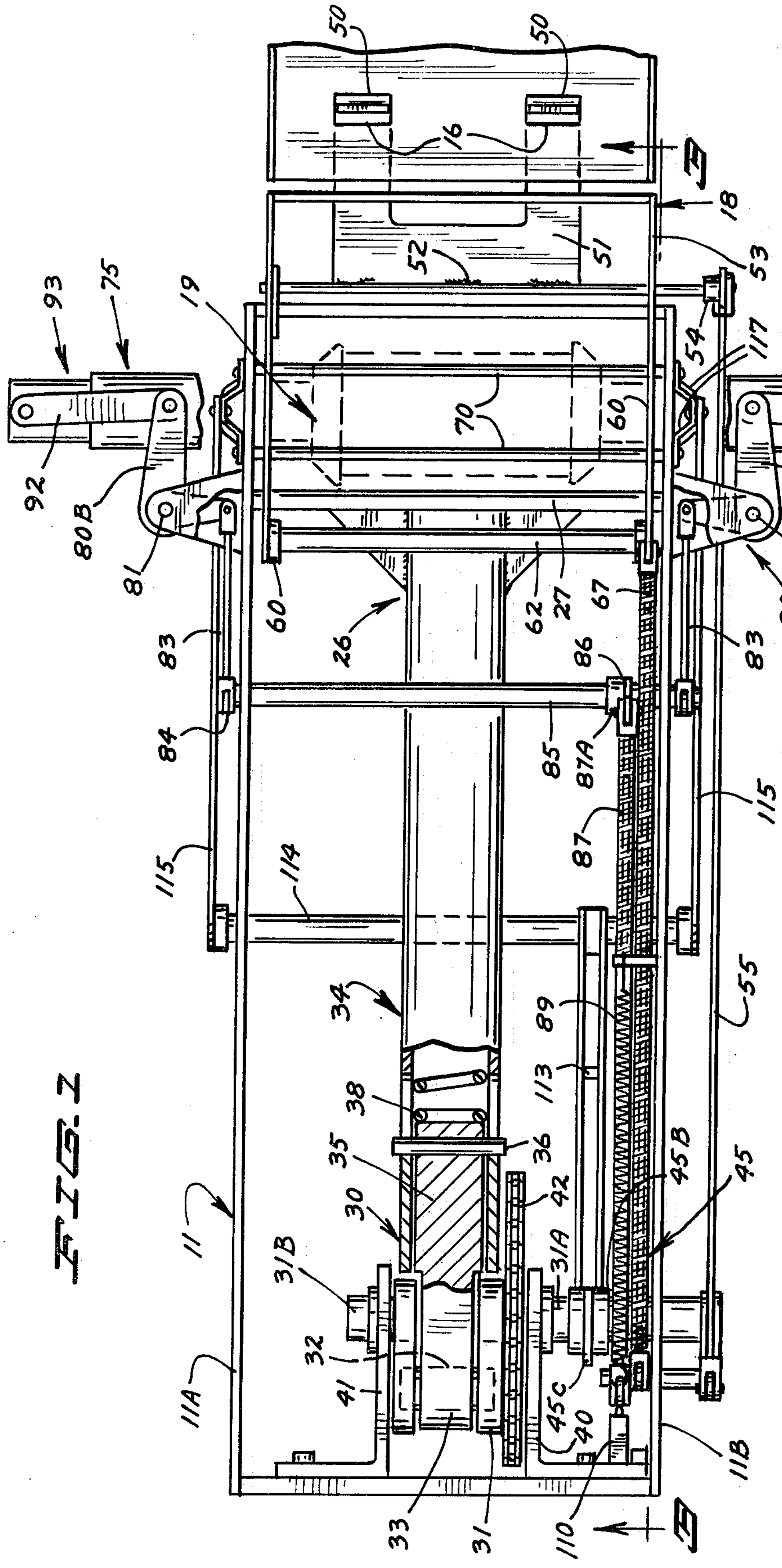
FIG. I
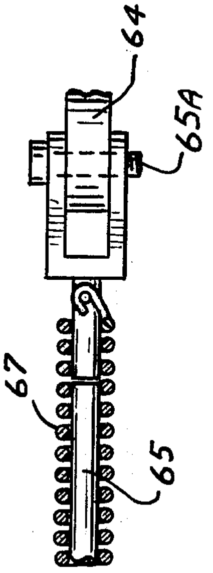
FIG. II

CONTAINER AND APPARATUS HAVING A SENSOR FOR RETURN DEPOSIT PAYOUT OF SUCH CONTAINER

CROSS REFERENCE TO RELATED APPLICATION

This application is a continuation-in-part of my copending application Ser. No. 746,662, filed Nov. 17, 1976, now abandoned, for Container Crushing Apparatus Having A Sensor For Return Deposit Payout.

BACKGROUND OF THE INVENTION

1. Field of the Invention

The present invention relates to identifiable containers and a method apparatus for sensing and disposing of containers.

2. Prior Art

Various can or container crushers have been advanced in the prior art. My prior U.S. Letters Patent No.'s 3,792,765 and 3,857,334 show such crushing apparatus. Also, by copending U.S. Pat. application Ser. No. 612,088, filed Sept. 10, 1975 for "Container Crushing Device" now abandoned discloses a crushing apparatus wherein the crushed containers are sorted as to material, so that only containers that meet certain criteria would be selected for direction to a particular storage container.

However, it is now indicated that a deposit will be required on beverage containers and thus they will be qualified for receiving return payments. Deposits are not now required for metal cans except in the states of Oregon and Vermont. Cans cannot be reused or resealed, as glass containers can, and thus the cans have to be recycled. This means that the cans must be stored for a period of time subsequent to their return for repayment of deposit. The empty cans also have to be handled and returned to recycling plants. Crushing the containers is thus important to save storage and transportation space, and make the containers easier to handle.

The present device relates to the identification of particular containers to be crushed so that a proper payout or return of deposit can be made.

The basic construction and sequence of operation of the crushing apparatus is similar to that shown in said U.S. Pat. application Ser. No. 612,088, so the actual crushing apparatus is shown somewhat schematically. The can sensing means can be installed in the crushing apparatus illustrated in said application.

An irregularly profiled end wall of a can which permits movement under changing pressure is shown in U.S. Pat. No. 1,987,817. It has an internal recess centered on the longitudinal axis, and also annular bands that form bosses. The use, however, is much different from can identification for purposes of determining if a return deposit should be paid.

A preserving can is shown in U.S. Pat. No. 2,027,437 and a center boss or bump is shown on the bottom end wall. In this patent, however, the curved shape to the bottom wall is said to render it difficult to force the blade of a can opener through the wall to thus minimize the possibility of a person cutting through the bottom instead of removing the lid.

A cake pan with a boss on the bottom is shown in U.S. Pat. No. 3,237,910, and other containers with irregular end walls are illustrated in U.S. Pat. No.'s 650,949; 3,889,835; 3,905,507; and 3,907,152.

A container with a protrusion on the side wall is shown in U.S. Pat. No. 2,983,403.

SUMMARY OF THE INVENTION

The present invention relates to beverage containers or cans which are formed in a suitable manner, and which include particular means for identification of the can on the ends of the cans. The means for identification can be formed into the can during manufacture without any increase in costs. The means for identifying the can as shown comprises a raised indicia positioned in a desired manner relative to the longitudinal axis of the can and using a probe sensor with the raised indicia or the sensing probe being generally annular and concentric with the can axis so that the identification can be made regardless of the rotational position of the can relative to the sensing apparatus.

The sensing apparatus can be used with any type of disposing device, and in the form of the invention shown it is used with a can crushing apparatus. The cans merely can be sorted for disposal, rather than crushed, or they can be placed into any desired container for hauling, or other location.

As shown, the apparatus has means for receiving cans, and for sorting the cans as to weight in a known manner and moving proper weight cans to an identification zone where they are held momentarily out of reach of a person returning the can. The sensing can be with suitable sensing devices for a particular indicia such as shape, particular area of conductivity, optically recognized patterns or other identifying indicia. The sensing device delivers a signal to a tallying device or indicator in a well known manner, indicating that a particular action should be taken relative to the can such as payment of return deposit, and subsequent to identification the can is released into a crushing apparatus and is crushed.

The present application also discloses improvements to the crushing apparatus by providing pivoting can supports that aid in supporting the can in a proper location for the crushing operation. The device is controlled mechanically except for the indicating circuit itself, and is relatively foolproof in operation even during high processing speeds.

The sensing device as shown has probes that are made so they will lift each container from both ends, and properly center it axially for sensing. In the form shown, sensing is made to identify to a particular external configuration on one end wall of the container. It is not important whether the container is properly oriented end for end when being sensed.

In addition to the types of sensing devices shown, the same container centering apparatus can be utilized with probes that have magnetic detectors which will detect the presence of a particular type or size of magnetic patch on the ends of the can, or probes sensing particular codes such as the optical code that is now used as part of the marking of grocery produce can be used. Proximity switches or probes which complete a circuit through material of certain resistance can be used. With some sensing probes it may be necessary to have the can properly oriented end for end with only one sensing probe being used on one side of the machine only.

The probes have to be moveable to a position where they will permit a container to enter the holding or identification zone, and then move to pick up and center the container, and subsequently perform the identification process for providing the indication of whether the container is proper for return payment.

In the form of the invention shown in FIGS. 12, 13 and 14, a somewhat simplified probe is shown, which includes knife edge members that will complete a circuit through the indicia that is embossed into the can, and which can be manufactured and operated more simply and at a lower cost than the probe members shown in the first form of the invention. However, both include two members that sense a particular indicia on a can and which complete a circuit when the indicia is present.

The can is centered or oriented about its longitudinal axis through cone centering devices as previously explained, and as shown the particular can configuration can be a wide variety of types of probes and indicia sensing the ends of cans.

BRIEF DESCRIPTION OF THE DRAWINGS

FIG. 1 is a top part schematic plan view, with parts broken away, showing a container crusher utilizing the improvements of the present invention;

FIG. 11 is an enlarged view of a link connecting spring used for limiting the tension which can be carried by the link;

DESCRIPTION OF THE PREFERRED EMBODIMENTS

The container crushing apparatus illustrated generally at 10 in the first form of the invention includes a housing or frame member 11 which has side walls 11A and 11B, and as shown has suitable end walls in proper location for strengthening the frame. The side walls are used for supporting many of the components which are shown schematically. Reference is made to the previous application mentioned for more complete details of construction and cycling of operation of a typical crusher. The crushing apparatus has a container feed mechanism indicated generally at 12 for receiving and feeding in containers or cans to be crushed.

Figures 2, 3:
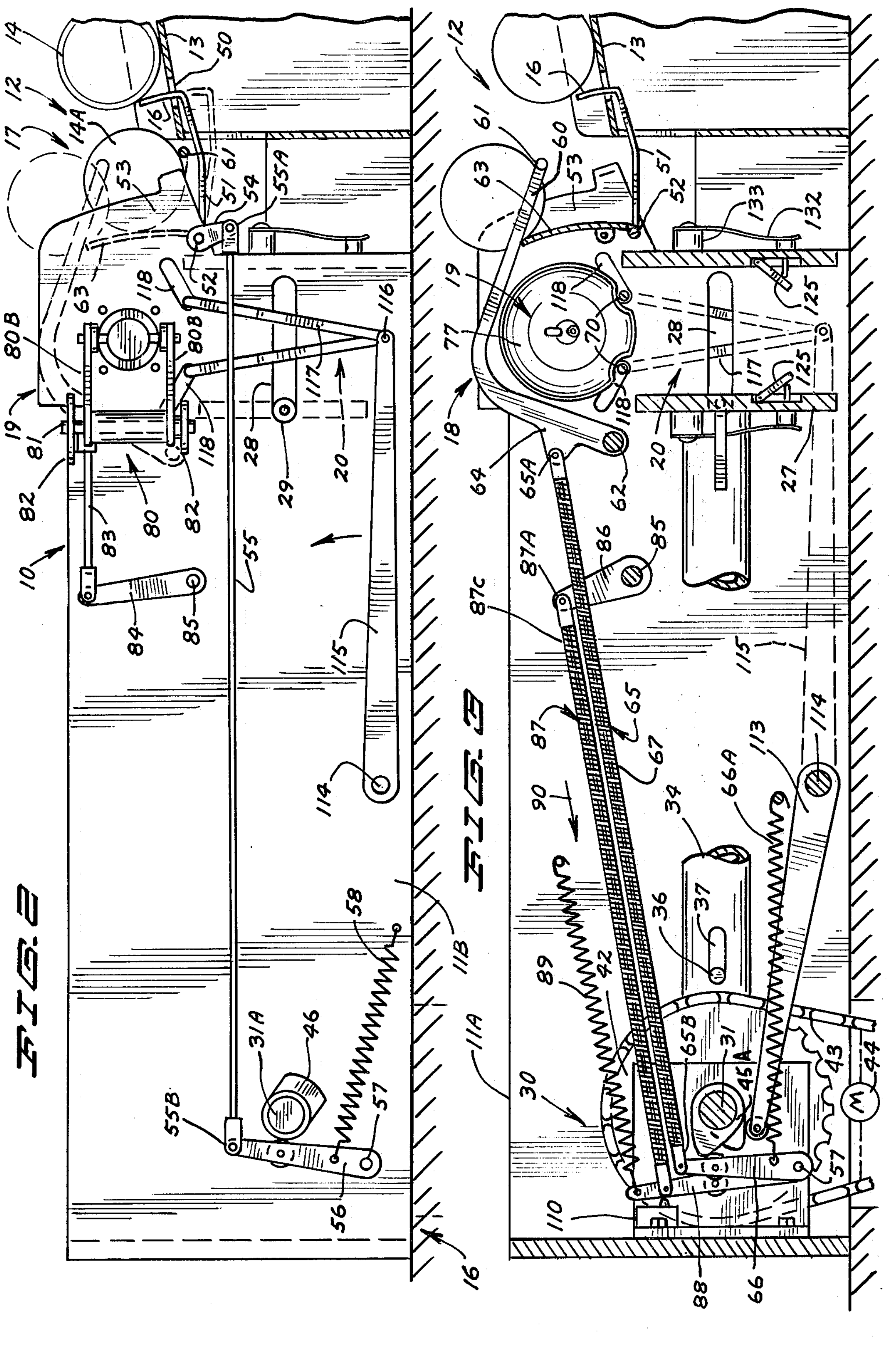
FIG. 2 is a side view of the device of FIG. 1.
FIG. 3 is a side sectional view taken on line 3—3 in FIG. 1.

The in feed device is attached to the frame 11 and has an inclined support wall surface 13 for receiving cans or containers shown in outline at 14. The term cans will be used in this description for convenience, but any type of cylindrical container may be used with the present device. The cans will roll down wall 13 and will be retained in a holding position which is shown in FIGS. 2 and 3 by suitable can retainers 16. The retainers 16 will release one can at a time into a zone 17 where the can 14A will be lifted by a lifting assembly 18 that also senses the weight of the can. If the can is of the proper weight it will be transferred into a can identification zone 19.

In the can identification zone 19 each successive can will be individually and selectively sensed to determine whether it meets certain criteria, and subsequent to the identification process the can will be dropped into a crushing zone indicated generally at 20. Subsequent to crushing, the can would drop through a provided opening below the crushing zone into a suitable container (not shown). It should be noted that the area below the crushing area or zone is open so that the can can drop freely after crushing.

CRUSHING APPARATUS

Referring primarily to FIGS. 1, 2, 3, 9 and 10, the crushing apparatus is illustrated. As shown, the crushing zone 20 is defined by a stationary platen 25 that is mounted between the side walls 11A and 11B, and held with sufficient rigidity so that it will provide a backstop for a movable ram assembly 26 to be used as a crushing member. The ram assembly includes a ram head 17 that extends laterally between the sides 11A and 11B, and as shown is guided in suitable slots 28 with pins 29 which rotatably support bearings. The pins 29 are fixed to the opposite side edges of the ram head 27, and slidably guide the ram head as it reciprocates.

The ram is driven by a crank assembly 30 that includes a crank shaft 31 having end portions 31A and 31B which are suitably mounted on bearings, and having a crank throw formed therein with a crank pin 32. A journal 33 of a connecting rod 34 is rotatably mounted on the crank pin.

The journal 33 as shown drives a connecting rod tube 34. The journal 33 carries a plug 35 that fits within the end of the tube 34 adjacent the crank assembly 30. A pin 36 is mounted in plug 35 and extends through suitable slots 37 in the tube 34. A heavy spring 38 is mounted with the tube 34 and the spring carries the load to the ram head 27, so that the force with which the ram head will move toward the platen 25 is limited. When the force on the ram head 27 exceeds the desired amount, the spring will compress, and pin 36 will slide in slot 37 to limit the force.

The crank shaft 31 thus has a single throw, and the supports for the shaft portions 31A and 31B include wall members 40 and 41 that are attached to the rear wall of the frame 11. These members 40 and 41 carry bearings for the crank shaft. The crank shaft is driven through the use of a sprocket 42, and a chain 43 leading from a suitable motor 44 which is shown only schematically. The motor can be selected to obtain a desired speed of reciprocation and crusher operation. The motor will be controlled by suitable switches.

CAM SHAFT AND CAMS

The outboard end of the crank shaft 30, between the support member 40 and the outwall 11B is also supported in a suitable bearing in wall 11B, and carries the cam assembly illustrated generally at 45 thereon. The shaft portion 31A also carries a cam 46 on the exterior of the wall 11B. The cam assembly 45 carries first, second and third cams 45A, 45B and 45C, respectively, that are used for operating the can transfer and lift arms, can identification members, and can release, and synchronizing such devices with the movement of the ram head 27.

Rotation of the crank shaft, of course, will cause the ram to reciprocate back and forth, and the cam assembly 45 and the cam 46 synchronize operation so the cans are sequentially and successively fed to the transfer zone, lifted into the identification zone and then dropped into the crushing zone, and are then dropped into suitable storage containers.

CAN IN FEED

The can retainer fingers 16 as shown extend through provided apertures 50 in the wall 13, down which the cans will roll (this wall 13 is inclined at a desired angle). The fingers 16 are part of an actuating arm assembly 51 that is attached to a shaft 52, which shaft is pivotally mounted in a suitable manner on side guide plates 53. The guide plates 53 are fixed to the side walls 11A and 11B respectively. Shaft 52 as shown has an arm 54 at one end thereof, and a tension link 55 is connected to the arm 54 through a suitable pivot pin 55A. The link 55 is a tension carrying link, and is connected at its opposite end as at 55B to a cam follower arm 56 that is pivotally mounted on a suitable pin 57. The arm 56 has a roller which follows the cam 46 in a conventional manner. The cam 46 is shaped and timed as desired for the operation, and is a relatively quick acting cam that will permit the fingers 16 to retract and to be moved upwardly quickly. The cam arm 56 is spring loaded to return the fingers 16 to their normal can retaining position through the use of a spring 58 that is shown only schematically.

CAN LIFT AND TRANSFER ZONE

When the fingers 16 are retracted (lowered), a can 14 on the wall 13 will be permitted to roll down into the can lift and transfer zone. The cans are then lifted up by the lift assembly 18 comprising a pair of can lifter arms 60 which are positioned on opposite sides of the frame. The base ends of arms 60 are fixed to a cross shaft 62, and the outer ends of arms 60 carry a cross shaft 61 that moves from a rest position shown in FIG. 2 where shaft 61 is below the path of a can rolling into the transfer zone after fingers 16 are retracted. The can 14A rests above the cross shaft 61. The arms 60 are raised as the pivot shaft 62 is rotated. A can in the transfer zone will be lifted by shaft 61 and rolled up against a suitable curved wall 63 and until it clears the top edge of this wall 63 (the wall 63 is fastened between the side plates 53 with clearance for arms 60) and then the can will drop down into the can identification zone.

The shaft 62 extends across the frame 11, and is suitably mounted in bearings. One of the arms 60 (adjacent wall 11B) has an ear 64 on the back side thereof and a control link 65 is pivotally mounted as at 65A to this ear. The opposite end of the control link is mounted as at 65B to a cam follower lever 66 that in turn is mounted onto the shaft 57 (shaft 57 extends inwardly from the side wall 11B a desired amount). The lever at 66 is urged against the cam 45A by a suitable spring 66A which corresponds to the spring 58 and is shown schematically. The cam 45A moves the lever 66 above the axis of the shaft 57 as crank shaft 31 rotates, and in so doing it controls the position of the can lift arms 60. When the cam actuates the lever 66, link 65 will be under tension and this will pivot the shaft 62 in counterclockwise direction as viewed in FIG. 2, tending to lift a can 14A in the transfer and lift zone and roll it up the wall 63. When the shaft 61 reaches its top position slightly higher than the position shown in FIG. 2, the can will be dropped over the top edge of the wall 63 into the can identification zone.

The linkage driving arms 60 is made sensitive to weight so that if the can is of excessive weight (as it would be if partially filled), the can will not be lifted. As seen in FIG. 11, the link 65 is split into two parts, and a small light tension spring 67 is placed around the link 65 and spans across the split of the link 65. One end of the spring 67 is fastened to link 65 at one side of the split, and the other end of the spring 67 is fastened to link 65 on the opposite side of the split, so that the two parts of the link 65 are held abutting only by the force of the spring 67. The spring 67 guides the two parts of link 65 so they do not misalign. The spring 67 limits the amount of tension force that can be transferred by the link 65 and will be selected so that if a can is partially filled, or for some other reason is of a higher weight than desired the lifter arms 60 will not be actuated. The excessive weight causes the spring 67 to stretch and the two portions of link 65 to separate. Any heavy can that is in the transfer zone will remain there, and the unit will not operate until such time as the can is removed. The can 14A in FIG. 2 is accessible from the exterior of the crushing machine.

The cam assembly 45 will provide proper timing for the operations.

CAN IDENTIFICATION

When the can is in the can identification zone 19, a feature of the present invention is to identify each can as to whether or not a return of a deposit is to be made on the can. In the present invention this is done by providing some indicia on the can that will permit the can to be separated out or identified from other cans on which no payment is to be made. It is necessary therefore to individually sense each of the cans before they pass into the crushing zone. An identification operation is performed on the can to indicate if a payment is to be made. This is sometimes called, for purposes of this application, making a tally of the can.

Referring now specifically to FIGS. 4 through 8 of the drawings, a device for identifying the individual cans in the identification zone is illustrated. It is necessary to provide a tally or indication whether a particular can in the identification zone is one on which a return payment is to be made for return of a deposit previously paid on that particular can or container. Thus, each individual can must be handled and identified, tested for whether or not it should be tallied as a payment can, and then delivered into the crushing zone.

Figure 9:
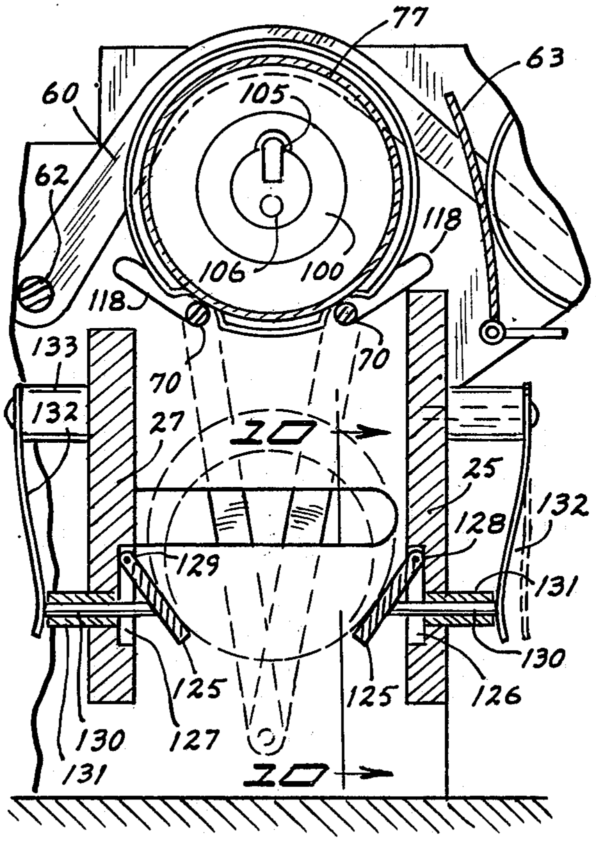
FIG. 9 is a fragmentary enlarged side sectional view of the crushing ram and platen of the present invention.
Figure 8:
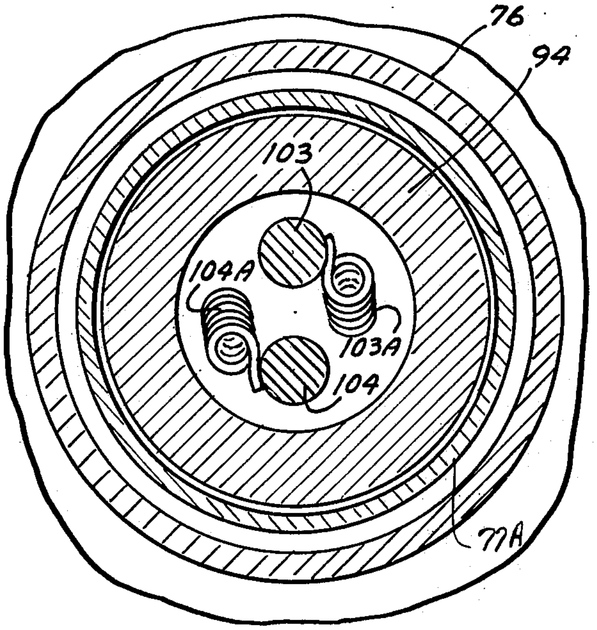
FIG. 8 is a sectional view taken as on line 8—8 in FIG. 5.
Figure 10:
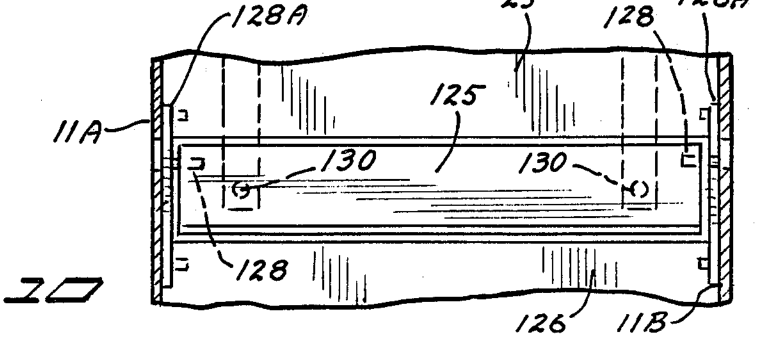
FIG. 10 is a sectional view taken as on line 10—10 in FIG. 9.

When each successive can is initially dropped into the identification zone, it will be supported onto a pair of spaced cross rods 70,70 the operation of which will be more fully explained later in relation to release of the can after testing. The rods 70 position the can and are spaced to orient the can with the center line of the can parallel to the rods. The cans are supported on these rods as shown in FIG. 9.

The can identification probes indicated generally at 75 are identically constructed, except one operates on the left hand side and one on the right hand side of the machine. The probes each include an outer cylindrical housing 76 that is fixed to the respective side wall of the machine and which provides a sliding housing or guide for a movable sleeve 77A of the probe, which will move in and out along the axis of the housing 76 and therefore generally parallel to the axis of a can 14B (FIG. 5) in the identification zone. Each telescoping or movable assembly 77A carries a can centering housing or centering cone 77. The centering housings are truncated cones that are simultaneously moved from the retracted position shown in FIGS. 4 and 5 when a can is first dropped into the identification zone to position wherein they will engage a can resting in the identification zone and will center it axially as shown in solid lines in FIG. 8 and in FIG. 6. The centering cones cause the can to move to position co-axial with sleeve 76.

The tapered inner surface of the cones 77 and movement of both cones toward each other causes the centering action. It should be noted in FIG. 9 that the lower edges of centering cones 77 are cut away to provide clearance for the cross rods 70. The can in the identification zone is supported on the cross rods 70 above the lower edge portions of the centering cones 77. Thus, when the cones move inwardly (toward each other) they will be sure to engage the opposite ends of the can in the identification zone.

Each of the probes is operated through the use of a separate bell crank assembly 80. The bell crank assemblies each are pivotally mounted on a pin 81 which extends between a pair of vertically spaced support ears 82 (FIG. 2) on opposite sides of the machine. The bell crank assemblies each have vertically spaced arms 80B held on a common center pivot member 80C. A separate ear or arm 80A is connected to one of the arms 80B on each bell crank. One end of a separate control link 83 is pivoted to each ear 80A. The opposite ends of links 83 are connected to arms 84, which are drivably mounted on opposite ends of a cross shaft 85 that is rotatably mounted to the side walls 11A and 11B of the frame. The position of the cross shaft 85 is controlled through the use of a control arm 86 that has one end of a suitable control link 87 connected thereto as at 87A. The opposite end of link 87 is connected to a can identification control arm 88 as at 87B. The arm 88 is spring loaded against cam 45B with a spring shown schematically at 89. A suitable cam follower roller that rides on the cam 45B is provided on arm 88. The position of arm 88 is controlled by the cam and the link 87 carries tension only. The link 87 is split and a spring 87C is used to hold the two sections of link 87 together. As shown the one end of spring 87C will span the split in the link and carry tension load to provide a limiting factor to the tension loading on the bell cranks. The arrangement is similar to that shown in FIG. 11 except the link and spring may be larger. The cam follower arm 88 is also mounted onto the shaft 57 for pivotal movement during operation.

Figure 4:
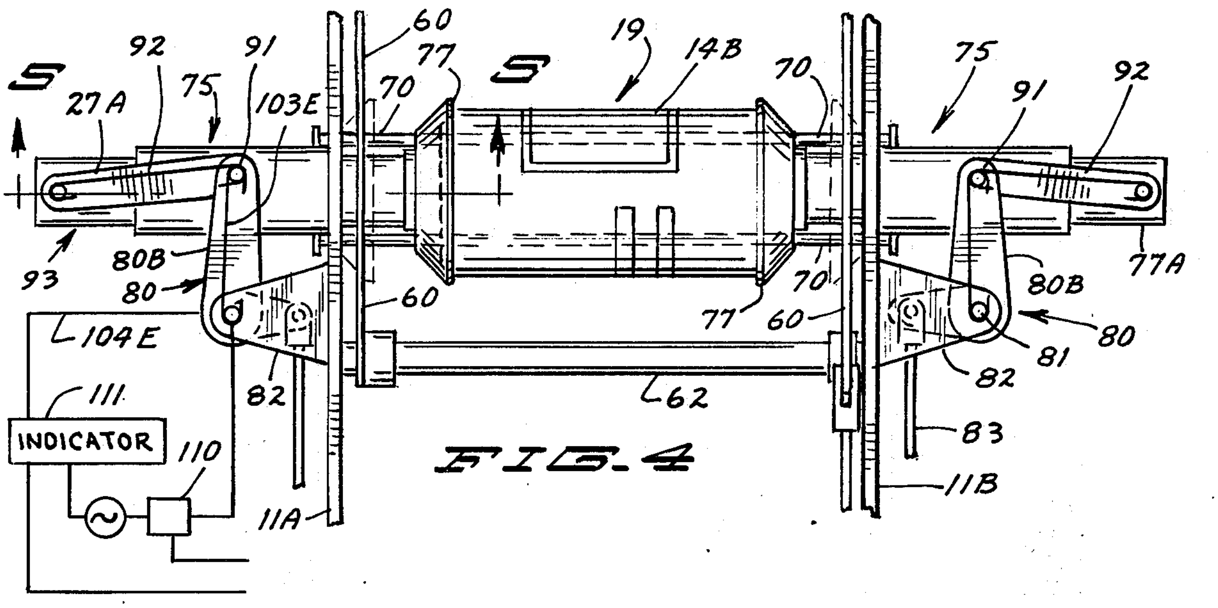
FIG. 4 is a fragmentary enlarged top plan view of the container sensing apparatus utilized in the identification zone of the crusher of FIG. 1.

When the cam 45B operates the arm 88 to place tension on the link 87 as indicated by the arrow 90, the shaft 85 will be pivoted by movement of arm 86 and will move the arms 84 in counterclockwise direction, as shown in FIG. 2. The links 83 are pulled in the same direction as the arrow 90 tending to pivot the bell crank assemblies 80 about pivot pins 81 as shown in FIG. 4. This will move the outer ends of bell crank portions 80B inwardly toward the center line of the frame for actuation. The outer ends of the bell crank portions 80B are pivotally connected through suitable pins and bushings 91 to tension links 92. The tension links 92 in turn are pivotally connected through suitable telescoping assemblies 93 (FIG. 5) which are inside the sleeves 77A to control the in and outward movement of the movable sleeves 77A, to which the cone centering members 77 are connected.

Figure 5:
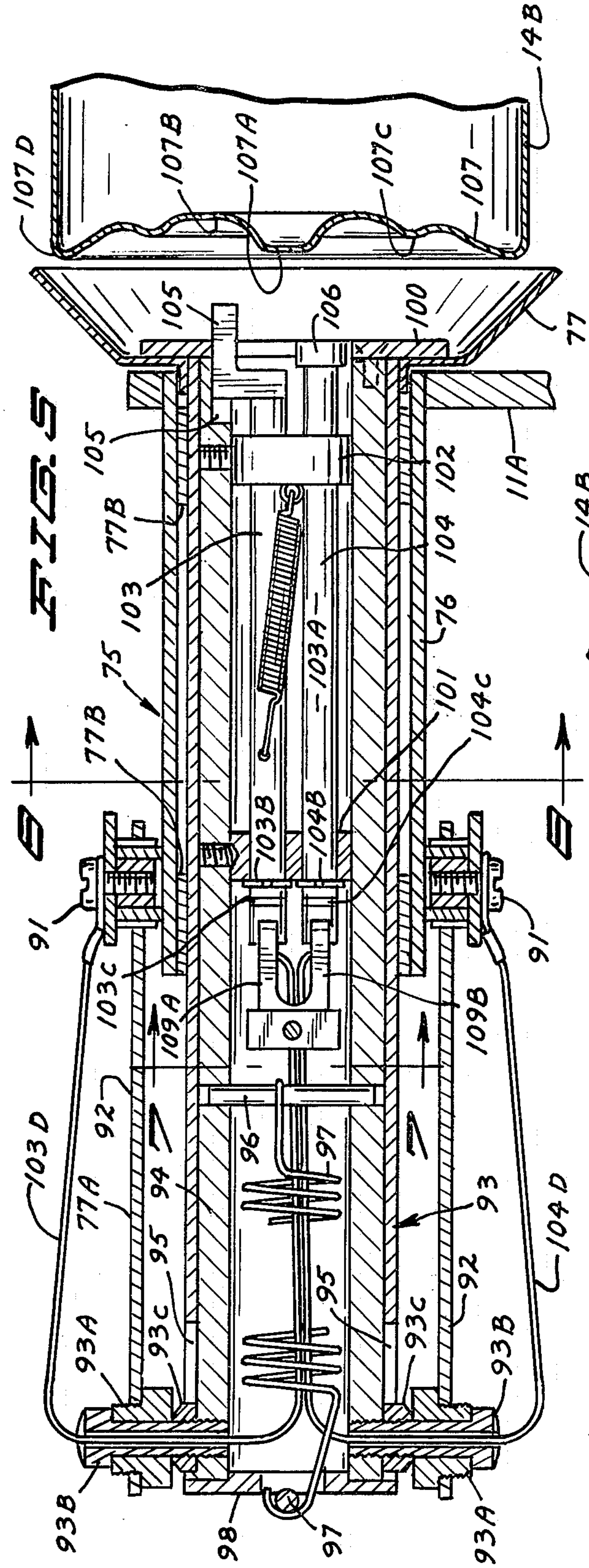
FIG. 5 is a fragmentary sectional view taken as on line 5—5 in FIG. 4.

Referring specifically to FIG. 5, it can be seen that the telescoping assemblies 93 are each driven through top and bottom bushings 93A that are each pivotally mounted in an aperture at the outer end of one of the links 92. Note that each assembly 93 is controlled by two links 92, one on the top and one of the bottom of sleeves 77A. The bushings 93A have center openings through which screws 93B are mounted. The screws 93B as shown have hollow passages in the center, for permitting an electrical wires to pass therethrough, and each screw 93B has a threaded portion that is threaded into an interior tubular sleeve 94. The screw 93B is secured in position onto the sleeve 94 with a suitable lock nut 93C, and the nuts 93C and screws 93B are slidably mounted through slots 95 that are defined in the sleeves 77A to which the cones 77 are attached. The sleeves 77A are supported in low friction bushings 94A within sleeves 76.

The control from the bell crank assemblies 80 and links 92 is to the interior sleeve 94, which can be made of a suitable low friction material if desired, such as a plastic material, and which is slidably mounted on the interior of the sleeve 77A. The interior sleeve 94 thus will slide axially relative to the sleeve 77A to which the cone 77 is attached and both sleeves 77A and 94 telescope relative to sleeve 76 in each assembly.

A cross pin 96 extends across the diameter of the tubular interior sleeve 94, and a control spring 97 is attached at one end thereof to this cross pin 96, and the other end of the spring 97 is attached to a pin 97 that in turn is mounted on an end cap 98 which is connected to the sleeve 77A. Therefore, in operation it can be seen that force that is transmitted by the bell cranks 80 will tend to move the screws 93B in the slots 95, and then the springs 97 will pull the sleeves 77A along until such time as the can centering cones 77 strike an obstruction. The springs 97 expand if the cones are stopped, and links 92 continue to move. The screws 93B will continue to move along the slots 95 until the inner sleeve is stopped against a can, as will be explained. When the sleeve 94 is stopped, the two portions of link 87 will separate, as controlled by spring 87C, to permit the cam arm 88 to move the full stroke of the cam.

Figure 6:
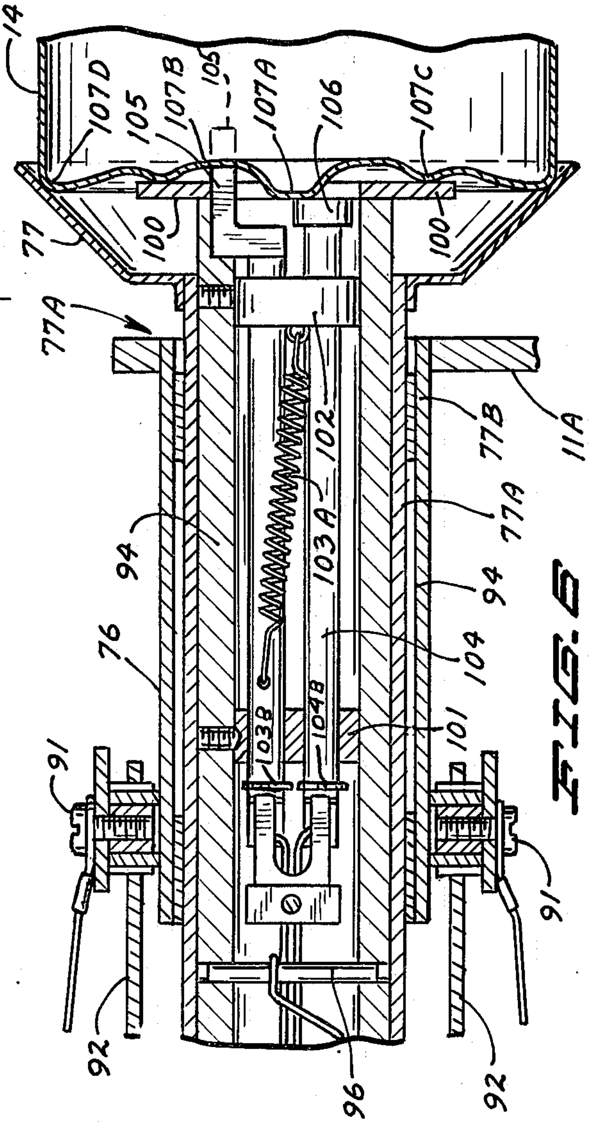
FIG. 6 is a fragmentary sectional view taken on the same line of view as FIG. 4, with parts positioned in a can lifting position.

The cams will be timed so that when the can lift operates to drop a can into the identification zone, the cam 45B will immediately be operated to pull on the links 87 and 83 causing the bell crank portions 80 B on each side of the machine to move inwardly, creating a tension on the links 92 on each side of the machine and the cone centering members 77 will move transversely to the frame of the crushing machine and engage both the bottom and top rims of a can that is in the identification zone. These centering cone members 77 will move inwardly an equal amount from each side of the machine, inasmuch as they are both controlled by a common cross shaft 85 and cam 45B and when one of the can rims is engaged by one probe, the can will be moved toward the other probe until the two cone centering members 77 start to oppose each other with forces that are tending to squeeze the ends of the can in. This will cause the can to slide along the interior cone surfaces. The angle of the cone surfaces is selected to permit the can to slide until the can centers. Continued movement of the probe cross shaft 85 and bell cranks 80 will cause the links 92 on each side to pull on the screws 93B. The forces on each of the centering cones 77 as they tend to center the can will start to increase load on the cones and the springs 97 will extend as the screws 93B slide in slots 95. This will cause the sleeve 94 to move axially relative to the sleeve 77A and as shown in FIG. 6, sleeve 94 will then move from its position shown in FIG. 5 to a position where it will be outward from the inner face of the cone centering member 77. A flange 100 is carried by the sleeve 94, and this then will move outwardly from the inner surface of the centering member 77. The flange 100 will strike a can and stop movement of sleeve 94.

Also as shown in FIGS. 5 through 8, the sleeve 94 has a pair of bulk heads 101 and 102 mounted therein. These bulk heads 101 and 102 are provided with bores that slidably receive rod members 103 and 104. The rods 103, 104 are made of suitable low friction plastic material, as are the bulk heads 101 and 102, and it can be seen that the rod 103 extends through the end of the sleeve 94 and carries a first can identification or indicia sensing member 105. In this case, the member 105 is an L shaped member and is offset a desired amount from the axis of the sleeve. The sensing member 105 fits within a provided receptable 105A defined on the inner wall of the sleeve 94.

The rod 104 also extends through the end of the sleeve 94, and carries a second can identification or indicia recognizing member 106 at its outer end. The indicia recognizing members 105 and 105 are spaced the desired amount from the central axis of sleeve 94, and are made in this form of the invention so that they sense the cross sectional profile of an end wall of a can 14B which is illustrated in FIGS. 5 and 6.

In FIG. 5 a particular can 14B has a deposit indicating indicia that comprises a specially shaped bottom wall 107. As shown, for purposes of illustration, the end wall 107 of the can 14B has a center projection 107A, which is centered on the central axis of the can and the end surface of which is a desired distance from the support plane of the can defined by the can rim 107D. A recessed annular ring or groove 107B that surrounds the projection 107A is aligned with the end of probe 105 and the end wall also has an annular rib 107C that aligns with the flange 100. Thus, the indicia in this instance comprises the shape of the can bottom end wall 107, and it should be noted that the bottom wall of the can will be sensed whether it is positioned on the right or the left hand side of the machine because both of the probes described are identical on opposite sides of the machine. Thus, end for end orientation is not necessary prior to sensing for repayment.

Other suitable types of indicia can be utilized. For example, the can bottom wall 107 could be provided with a small ferromagnetic strip or patch, or an electrically conductive strip or patch, or even an optically recognizable strip or patch which would be capable of being identified when the can is individually lifted, centered and sensed. Reflective patches could be used with photo electric sensors, which use a light source and sensor in one housing and sense reflected light. Proximity sensors that are oriented to sense particular material also may be used. Once the can is held properly for sensing many types of sensors can be used.

Movement of the rods 103 and 104 is controlled through the use of a pair of springs 103A and 104A which are attached to bulk head 102 and are in turn attached at their opposite ends to the respective rods through suitable apertures. The springs 103A and 104A urge the rods 103 and 104 axially out of the sleeve 94, that is in direction toward the center line of the can crusher frame and thus toward can 14B held in the cone members 77. Travel of rods 103 and 105 in direction toward a can is stopped through the use of suitable snap rings or the like indicated at 103B and 104B which are placed on the members and engage portions of the bulk head 101 to limit the travel of rods 103 and 104.

The rods 103 and 104 each carry, in the form shown, an electrically conductive ring of material indicated at 103C and 104C which are on the opposite side of the retaining ring from the bulk head 101, and are positioned at a desired relationship to an electrical connector member 109 that has spring contactor fingers 109A and 109B. Each of the fingers is resilient, and has a depending shoe like member that rides against the surface of the respective aligned rod 103 and 104 (see FIG. 7). The connector 109 is mounted in a suitable mounting block 107C to the side wall of the sleeve 94, and is carried by the sleeve, as are the bulk heads 101 and 102.

Each of the electrical conductor strips or rings 103C and 104C are connected to electric wires for completing an electrical circuit. The strip 103C is connected to a wire 103D that passes through the center of spring 97, and out through the aperture in the screw 93B. This wire 103D is also electrically connected to wire 103E that lead to a switch 110.

The switch 110 is shown schematically in FIG. 4 (and also shown by cam follower 88 in FIGS. 1 and 3). The switch 110 is made to close the circuit to a tally indicator 111 after the rods 103 and 104 have been positioned. Thus if a proper can is being sensed the contact between fingers 109A and 109B and member 103C and 104C will be completed before switch 110 is closed. Also, switch 110 will be opened before the rods and fingers 109A and 109B break contact. The switch 110 is used to prevent arcing at the relatively light fingers 109A and 109B by making and breaking the circuit at switch 110. The fingers 109A and 109B on the right side of the machine will be connected in parallel to indicator 111.

The switch 110 would noramlly be controlled by a cam on crank shaft assembly 30, but can be controlled in the location shown in FIGS. 1 and 3 and this showing is for convenience of illustration.

The wires 103D and 103E are connected to minimize bending and twisting of the wires during use.

The connector strip 104B is connected to a wire 104D that likewise leads to a wire 104E connected to the tally indicator 111. Thus, when there is a completed circuit through switch 110 and the connector 109 the tally indicator 111 would give a signal indicating that the count should be advanced one more (or some other suitable signal) and thus this can be used as an indication that the can is qualified for repayment.

Figure 7:
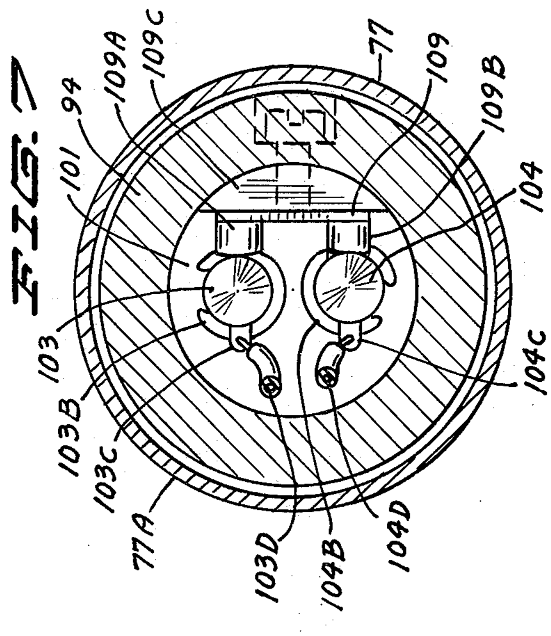
FIG. 7 is a sectional view taken as along line 7—7 of FIG. 5.

As shown in FIG. 7, the electrically conductive strip 103C will be connected to the finger 109A when the indicia member 105 is properly positioned in the groove 107B of the can, and the ring or strip 104C will be electrically connected to finger 109B when the can recognizing indicia member 106 is properly positioned on a lug 107A.

It should be noted that as the sleeve 94 is moved toward the can by link 92 and other drive members, sleeve 77A will be pulled toward the can by spring 97 until cone 77 engages can 14B and centers the can. Both cone members are moved inwardly at the same time. Once the can is centered axially and held by the cone member the spring 97 will start to expand. The sleeve 77A will be stopped, and sleeve 94 will continue to move until member 100 strikes the can bottom wall. The ends of the recognizing indicia members 105 and 106 will engage the can end wall 107 of the can 14B held in the centering member 77 before member 100 does, (if the can has proper shape), and the rods 103 and 104 will slide through bulk heads 101 and 102 against the action of the springs 103A and 104A until the flange 100 strikes the can. The pull link 87 is split and held together with a tension spring 87C as previously explained to limit the amount of force that can be exerted on the bell crank 80 and thus on the sleeve 94. The limiting of force permits having a stroke on bell crank 80 sufficient to accommodate a range of can lengths.

If the can end wall is of the proper shape the rods 103 and 104 will slide to position shown in FIG. 6 and the electrical circuit will be completed to the tally indicator. An indication will be given that this particular can that is being sensed should be tallied for repayment of a deposit.

The tally indicator can be of any desired form, and is not shown in detail. It can be a digital counter, and can be hooked directly to a repayment device in any desired manner.

After the cycle for identification has been completed through the use of cam 45B, the cam 45B will retract fast which will retract the bell crank 80, moving the links 92 outwardly, and thus pulling the sleeve 94, and the sleeve 77A away from the can. It should be noted that the sleeve 77A is slidably mounted in the outer housing 76 on suitable antifriction bearing 77B, for fast, low friction operation.

The can will then be dropped down on the cross rods 70 as previously explained, and the cam 45C is used to operate a pivoting can release control lever 113 that is mounted onto a shaft 114. The can release lever 113 has a cam follower roller thereon. A pair of levers 115 are connected to the shaft 114 on opposite sides of the machine, and the outer ends of the levers 115 will be moved and are each in turn pivotally mounted as at 116 to a pair of straps 117. A pair of these straps are on each of the opposite sides of the machine. Each strap is attached to one of the cross rods 70,70. The lifting of the straps 117 will lift the cross rods and the cross rods will slide in slots 118, separate, and drop the can into the crushing area 20.

CAN CRUSHING

As previously explained, the crushing area 20 is defined between fixed platen 25, and the ram head 27. The ram 26 reciprocates in longitudinal direction when it is operated and when the can initially drops down into the crushing area 20 the ram will be retracted. The can will come to rest on and be positioned between a pair of retracting can rests comprising flaps or doors 125,125. The can rests 125,125 comprise small trap doors that are mounted within a transverse recess 126 in the platen 25, and in a recess 127 defined in the cross head 27. The recesses 126 and 127 extend across the respective platen and ram cross head and are generally parallel and align horizontally with each other.

The doors or can rests 125 are pivotally mounted with suitable pins at the opposite edges of the platen and the cross head about pivot axes indicated at 127 and 129 respectively. These pins can be mounted in small plates 128A as shown typically in connection with platen 25 in FIG. 10. These plates 128A are bolted to the side surfaces of the platen and cross head and will hold the pivot pins in place. The lower edge portions of the can retaining flaps or doors 125 are urged outwardly by small plungers 130 that are slidably mounted in suitable sleeves 131 that in turn are mounted on the backsides of the platen 25, and the cross head 27, respectively. The ends of the plungers are beveled to provide suitable contact with the doors 125. The plungers 130 are spaced apart so that they act near the outer edges of the can rest doors 125. The plungers 130 are each urged inwardly that is, toward the area defining the can crushing area through the use of leaf springs 132 that are suitably mounted onto blocks 133 attached to the outer or back surfaces of the platen and cross head respectively.

The can rest members 125 are urged to pivot out with sufficient spring force so that they will support a can in position as shown in dotted lines in FIG. 9. Note in FIG. 9 that two dotted line representations of cans are present to show the range of can diameters that are supported.

After the can is dropped into position and is resting on the can rests, the ram will continue moving under power of the motor, and the ram cross head moves toward the platen 25. This will crush the can held in the can rest members 125, and as the crushing stroke is being completed the can rest members 125 will pivot against the action of the springs 132 retracting the plungers 130 and causing the members 125,125 to pivot and retract back into their respective recesses. The surfaces of the can rest members form a part of the crushing surfaces. When they retract their outer surfaces are substantially coplanar with the respective surface of the platen 25 and the ram head 26. The can rest members also aid in ejecting the cans after crushing. If a can is sticky, it may adhere to a ram or platen. However, the spring loaded can rest doors will eject cans so they will drop down when the ram retracts.

As the sequence continues there will be another can in the sensing unit at the same time (or before) the ram is being retracted, and the process continues as long as there are cans in the feed chute of the unit.

The retracting can rest members 125,125 form a unique way of holding cans in position for crushing regardless of the type of can sensing mechanism, and find utility on a wide variety of crushing apparatus. They are not suspectible to damage during the crushing operations, and will retract out of the way conveniently while providing an adequate support and proper positioning for the cans without any tendency of one end of the can to drop through the crushing zone.

The device then operates to individually handle each can in succession, locate each can for identification, probe or sense the can for particular indicia, make an appropriate tally and then release the can for crushing. The process if fast and accurate.

Figure 13:
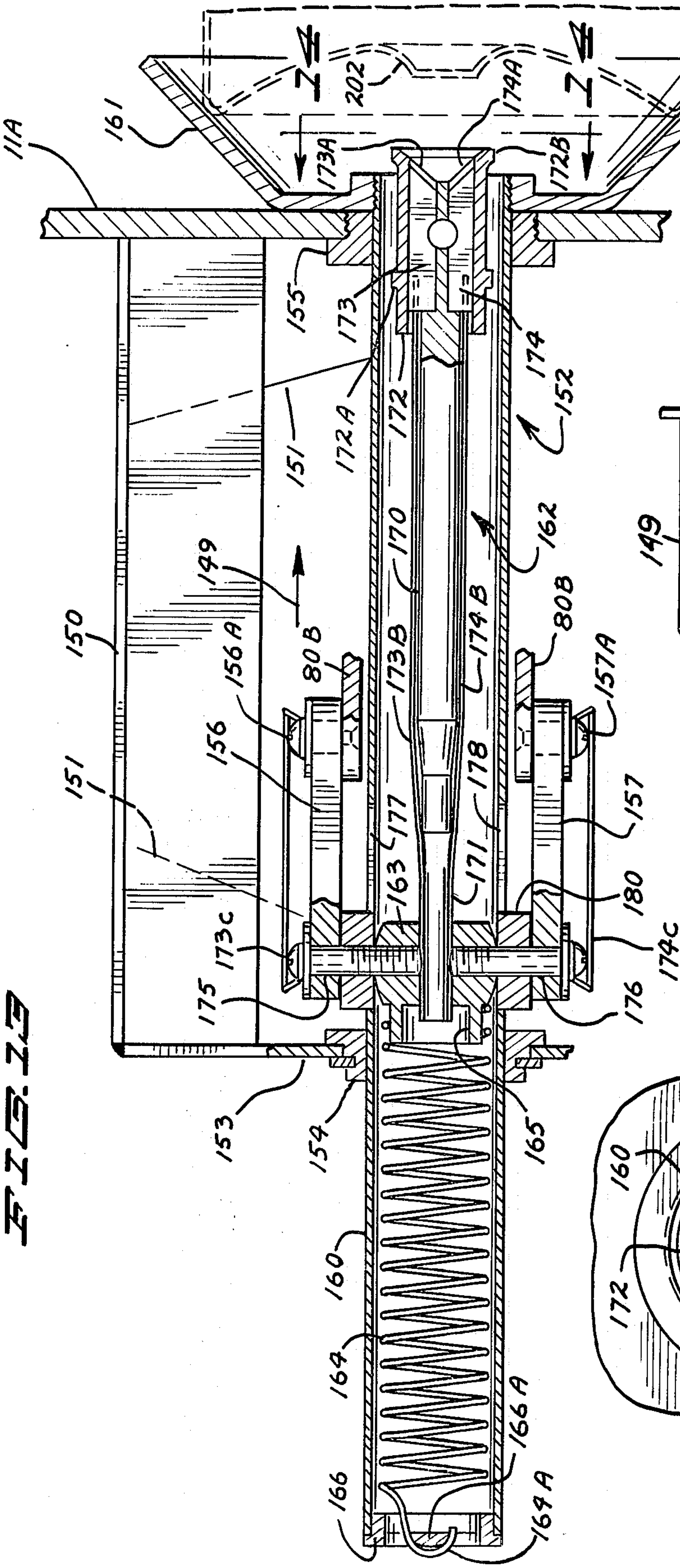
FIG. 13 is a vertical sectional view of a modified form of the present invention showing a modified probe utilized for sensing or identifying container.
Figure 12:
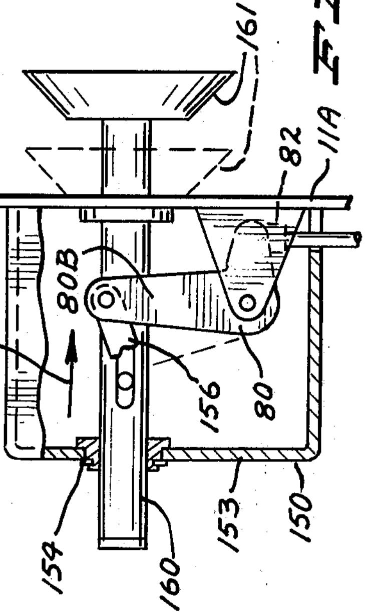
FIG. 12 is a schematic top plan view of a probe assembly made according to the second form of the invention with parts in section and parts broken away.
Figure 14:
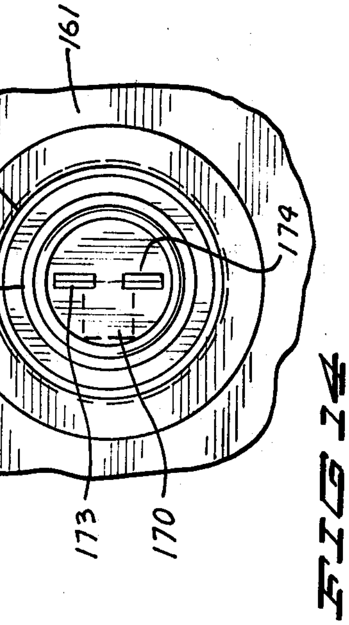
FIG. 14 is an enlarged view of the device of FIG. 11 showing a portion of a can in position to be sensed.
Figure 15:
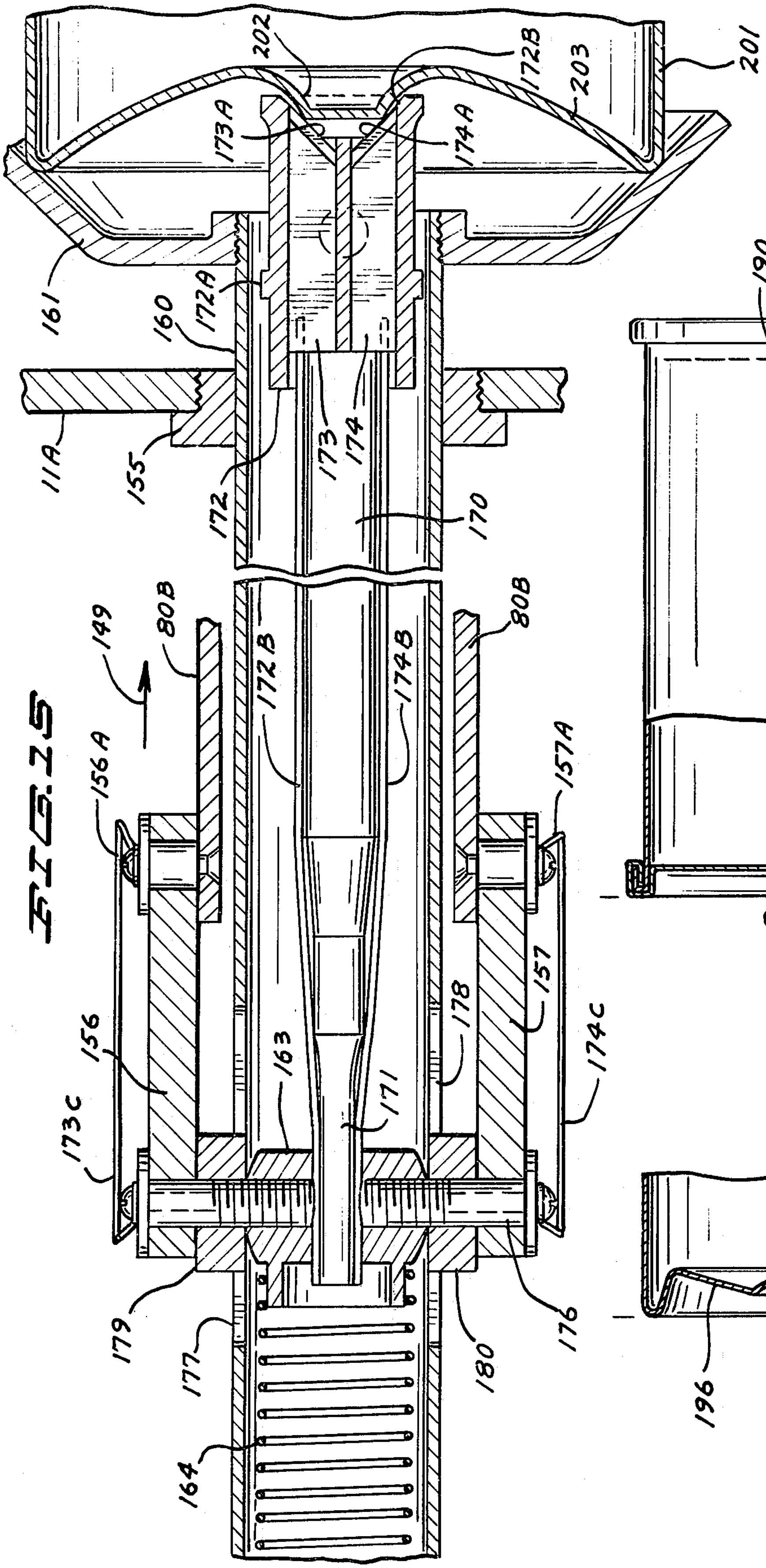
FIG. 15 is a view taken along line 15—15 in FIG. 12.
Figure 17:
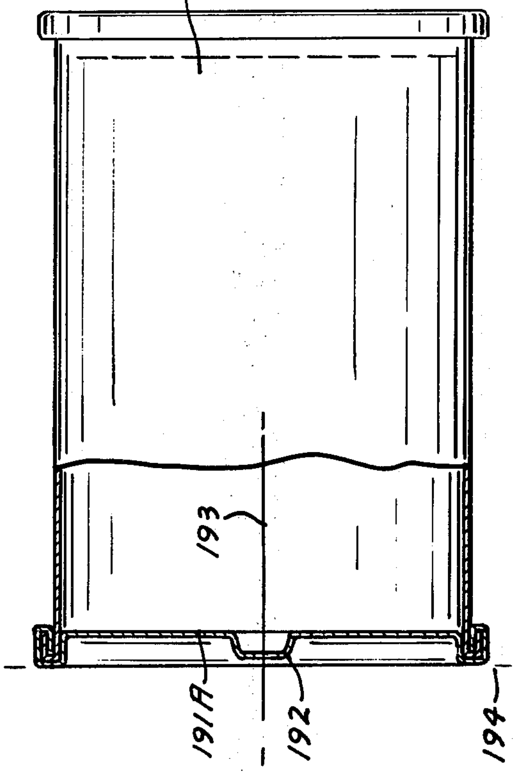
FIG. 17 is a further fragmentary view of a can including means for identification made according to the present invention.

For orientation purposes, a fragmentary top view of a second form of the invention is shown in FIG. 12, and FIG. 13 and 15 are vertical sectional views which would correspond generally to the views of FIGS. 5 and 6 of the first form of the invention. The bell crank assemblies 80, which are positioned at the top and bottom of the probes are substantially the same as in the second form of the invention, and include links that will move the movable members for centering a can to be identified inwardly toward the opposite ends of a can held in the identification zone. The means for holding the can in the identification zone and releasing it are not shown in the second form of the invention and it is to be remembered that two centering cones (one of which is shown in FIGS. 13 and 14) are utilized, just as two such cones are utilized in FIGS. 4,5 and 6. The controls and actuating mechanism can be the same as those previously shown. The bell cranks can also be the same, although as will be seen the support mechanism and the links for the centering cones or housings are modified to simplify the construction.

In FIGS. 12 and 13, the wall 11A is shown. This is the same side wall as the wall 11A shown in the first form of the invention. The wall 11A in turn has a support frame 150 fixed thereto and extending laterally out therefrom. While this is shown somewhat schematically, the frame can have suitable braces 151,151 at its inner and outer ends to hold it securely with respect to the wall 11A and form supports at the top and bottom of the can identification probe assemblies indicated generally at 152. These can identification probe assemblies would then correspond to the assemblies 75 in the first form of the invention.

The support 150 would in turn support an end wall 153 which is fixed with respect to, generally parallel to, and is spaced from the wall 11A. The wall 153 in turn supports a low friction bushing 154 that is concentric with a low friction bushing 155 mounted in the wall 11A, and which bushings are coaxial. The central axis of the bushings is generally perpendicular to the wall 11A.

For sake of simplicity, the bell crank assemblies are shown only schematically, and the bell crank members 80 are positioned at the top and bottom of the can centering assemblies 152, and these are mounted onto suitable support ears 82 as in the previous form of the invention which are only shown schematically, but which serve to illustrate the fact that the bell cranks pivot about vertical pivots, and when actuated they will move inwardly as indicated by the arrow 149.

The bell crank arms 80B in this form of the invention connect to links 156 and 157, at the top and bottom of the assembly, the links are pivotally connected to the arms 80B with suitable pivot pins 156A andd 157A, respectively and these pins are formed in a suitable manner so that the links will pivot about their respective pins 156A and 157A. The links 156 andd 157 may be made of a suitable plastic material, and can easily be molded if desired.

The can centering assemblies 152 each include a main mounting sliding sleeve or tube 160 which is slidably mounted in the bushings 154 and 155. The tube 160 (there is one on each side of the machine) carries a generally part cone shaped can centering member 161. There are thus two can centering members 161 substantially identical to the members 77 in the first form of the invention. The centering members are directly opposite as shown. As can be seen the cone centering members are fastened onto the tubes 160 in a suitable manner, and as shown they may be threaded onto the tubes 160.

The cone centering members 161 are on the inner sides of the walls 11A and 11B as in the previous form of the invention. A can identifying probe assembly 162 is mounted on the interior of tube 160. The can identifying probe assembly has an interior end that is supported in a ring type bushing 163 that is slidably mounted therefor inside the tube 160.

The outer surface of the bushing 163 is part spherical, so that it can tilt or cock inside the tube 160 without binding. A spring 164 is connected to a sleeve 165 formed at one end of the bushing 164. The spring can be threaded to the sleeve, or connected in any other suitable manner. The spring 164 is also therefore positioned inside the tube 160 adjacent the end opposite from the respective cone centering member 161. A tube cap 166 is provided at the outer end of the tube 160, and this cap has a cross bar 166A that is used for connecting a hook portion 164A of the spring 164. The spring 164 is a tension spring, and as will be explained is used for urging the tube 160 and can centering member 161 on each side of the machine inwardly toward a can positioned on the provided can holding members.

The probe assembly 162, as shown, comprises a center support rod 170, which can be made of a suiable plastic material, and which is tapered at its inner end to a smaller diameter section shown at 171, which fits within an opening in the bushing 163. The opposite end of the rod 170 is supported by an outer sleeve 172, and the sleeve houses a pair of knife edge blades 173 and 174, respectively. The sleeve 172 as shown is recessed inwardly so that it will be of a configuration to permit a can identification protrusion or bump, which will be explained later, to enter the central opening of the sleeve. The knie edge blades 173 and 174 have sharpened knife edges 173A and 174A, respectively at the ends thereof. The knife edge blades are positioned in slots formed in the end of rod 170, and the outer edges of the blades extend beyond the periphery of the rod 170 and engage the inner surface of sleeve 172 snuggly. The sharpened edges of the knife blades are in position to engage an identifying member on the can. The sleeve 172 has an annular guide flange 172A that provides a guide on the interior of the tube 160. This flange is smaller diameter than the interior of the tube 160, and while the sleeve 172 is centered as illustrated, it can move transversely in the tube 160 and when not in use the sleeve flange 172A would rest on the lower portions of the interior surface of the tube 160. The movement of the sleeve 172 permits the knives to move to "center" on a can that is being identified.

Each of the knife blade members 173 and 174 is connected to an electrical conductor such as a copper wire, and which are indicated at 173B and 174B, respectively. These conductors are electrically connected to the knife blades in any suitable manner (such as being pressed against the blades or soldered in place). The wires or conductors extend along the surface of the rod 170 back toward the bushing 163. It can be seen that these conductors are also positioned on the interior of the bushing 163, and the conductors and the rod 170 are held in place relative to the bushing 163 with a pair of connector screws, which also form pivot pins, and which are indicated at 175 and 176, respectively. These screws 175 and 176 thread into the bushing 163, and by suitable tightening will clamp the conductors 173B and 174B against the end portion 171 of the rod 170 and also securely hold the rod 170 relative to the bushing 163 so that when the rod moves axially the bushing will also move. The pins or screws 175 and 176 pass through provided guide slots 177 and 178, respectively formed in the wall of tube 160. Spacer bushings 179 and 180 are positioned to slide in slots 177 and 178. The spacer bushings space links 156 and 157 from the bushing 163.

The spacer bushing members 179 and 180 are thus slidably guided in the slots 177 and 178, respectively, and bear against the surface on the exterior of bushing 163 that is on the interior of the tube 160. The attachment screws or pins 175 and 176 pass through provided apertures in the links 156 and 157 and in spacer bushings 179 and 180. The ends of the links 156 and 157 are pivotally mounted on these screws 175 and 176. The screws 156 and 157 are electrical conductors, and thus will carry electrical signals from the conductors 173B and 174B, respectively to the respective connecting wires 173C and 174C that are on the exterior of the tube 160 and these wires in turn are mounted on pins 156A and 156B which are the pivot pins mounting links 156 and 157 to the respective bell cranks, and will be connected to suitable tally indicating means as shown in the first form of the invention.

The cone centering member 161 is of sufficient size, and tapers at a desired angle to fit over the end of a can that is to be sensed or tallied. Representative cans are shown in FIGS. 13, 15, 16 and 17. For example a typical container or can shown at 190 (FIG. 17) can be any desired type of beverage can (as shown a three piece can) and the end of the can indicated at 191 is formed in a desired manner to include a projection 192 that forms a concentric portion that is offset relative to the adjacent end wall portions indicated at 191A. This forms a surface irregularity. The projection 192 is concentric with the central axis 192 of the can. The can 190 is shown only typically, and may be any desired size or shape. However, the end wall of the can is shaped to have a projection offset with respect to the adjacent portions of the end wall. The word "projection" means either a boss that projects outward as shown or inwardly to the interior of the container. An inward projection would form a recess from the exterior of the can into which a sensing probe may be inserted for sensing. The identifying projection is concentric with the longitudinal axis of the can. The boss 192 is spaced inwardly from the plane indicated at 194 on which the can would rest when it is supported on this end of the can.

Figure 16:
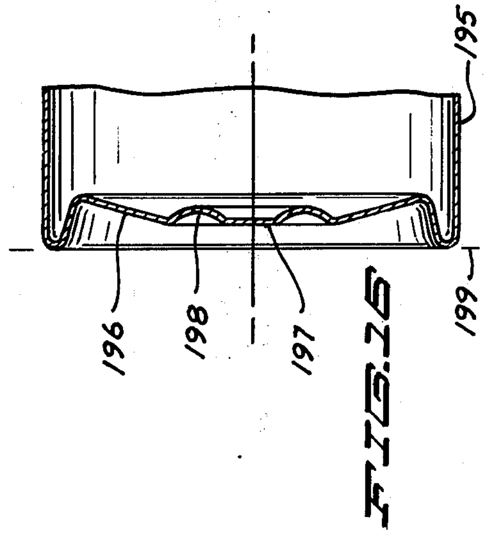
FIG. 16 is a fragmentary sectional view of the bottom or end portion of a can illustrating a modified form of indicia.

FIG. 16 in turn shows another can 195 which has an end wall 196 that is formed in a suitable die, and as shown an identifying projection 197 forms an identifying indicia that is surrounded by a recess or annular groove 198 so that it extends outwardly from the adjacent portions of the end wall 196. This is another way of obtaining the relief around the sensing projection, which is also centered on the longitudinal axis of the can as shown.

Further, the projection 197 does not extend beyond the plane 199 that is the support plane for the can when it is standing on that end so the outward projection does not interfere with support for the can.

A can 201 is partially shown in FIG. 15, and also in dotted lines in FIG. 13 and this can is generally similar to the can 190 but is a seamless can with a projection or boss 202 in the center, and the end wall 203 is relieved around the projection or boss 202 and also is, as shown, recessed below the plane defined by the support rim of the can.

In sensing a can, the bell cranks 80 would be operated as previously explained by cams to move the links 156 and 157 in a direction toward the wall 11A, and as indicated by the arrow 149. As the links 156 and 157 start to move toward the wall 11A they act through pins 175 and 176 directly on rod 170. The pins and guide bushings 179,180 will tend to slide in the slots 177 and 178 relative to tube 160. The spring 164 will then expand and exert a force through the cap 166 tending to move the sleeve 160 relative to its bushings 154 and 155 inwardly toward a can supported on the can support members in the center of the identifying members and on the interior of the wall 11A. The spring 164 will pull the sleeve member 160 inwardly toward a can, and because there are two can centering members 161 on opposite sides of the frame, as previously explained, the members 161 will move inwardly until they engage the can. The centering members 161 will act to center the can, for example the can shown at 201, relative to the central axis of the centering members, which is also concentric with the central axis of the sleeve 160 and the bushings 154 and 155.

When the centering members engage a can, generally as shown in dotted lines in FIG. 13, and the opposite cone centering member 161 also engages a can, then the centering members will be stopped from movement and this of course will stop the movement of the sleeve 160 relative to the bushings 154 and 155. However, because the guides 179 and 180 are slidably mounted in slots 177 and 178, continued movement of the bell crank and the links 156 and 157 will cause the pins 175 and 176, and the bushings 179 and 180 to slide in the slots 177 and 178 which are formed in the wall of the tube 160. This in turn will cause the spring 164 to expand, and will permit the rod 170 to be moved inwardly toward the end of the can.

If the rod 170 is slightly off-center because the flange 172A is resting against one of the walls of the sleeve 160, the open end of the sleeve 172, which has a tapered inner surface indicated generally at 172B, will tend to center on the boss 202, until the knife edges 173 and 174 physically and mechanically contact the metal boss 202 when the end wall of the can causes an electrical connection to the respective knife blade members 173 and 174. The taper on the interior surface of sleeve 172 may be at a desired angle which permits ease of centering. When the knife blade members both contact the can boss an electrical circuit will be completed through the boss 202, which is part of the metallic end wall of the can, from one of the knife blades to the other, and this means that a circuit will be completed through the conductors 173B and 174B back to the pins 175 and 176, and back to the wires 173C and 174C. When the proper indicia is present on the can as sensed by the probe a direct closure of an electrical circuit is achieved.

Of course, if the indicia or boss 202 is of the wrong size, or is not concentric, or if there is no boss on the can, there would be no electrical connection. If the end surface of the sleeve 172 contacts a planar wall of a can no electrical connection would be possible. Thus the knife edge blades 173 and 174 must be recessed inwardly from the end surface of the housing or sleeve 172, to insure that there won't be any connection unless the properly shaped indicia is present.

This "boss" indicia then can indicate when a return payout is to be made for a return of a deposit made on a can, or other suitable container. The container may be nonconducting but may include a metallic indicia such as that shown at 202. The container itself could be made of a nonconducting material as long as the sensed member is conducting to complete the electrical circuit to provide an indication that the can is of a particular type on which a return deposit is to be paid.

As previously explained, once the sensing has taken place, and a momentary pulse or signal is achieved, the bell cranks can be reversed through the power mechanism previously shown and the can centering members or cones 161 retracted. Then the can is released and moved to any desired location or it can be crushed, or disposed of in any desired manner after identification.

Thus, by provision of a can having an end wall that is formed in the desired manner to have indicia that is concentric with the central axis and which can be sensed by suitable probes, identification for return payout purposes can be easily achieved in both forms of the invention. The second form of the invention requires only one movable rod or member for probing and does provide for positive electrical connection when a properly shaped indicia is present, while in the first form of the invention two sensing members are required for sensing a particular configuration at the end of the can.

It might be noted that the knife blade members are generally flat and planar, as shown in FIG. 14, and fit within recesses inside the sleeve 172, and recesses are also formed in the rod 170, as it is formed. A suitable set screw can be passed in through the side of the sleeve 172 and threaded into the portions of the rod 170 to bear against both of the blades to hold them in position. The set screw would be a recessed set screw that would out of the way, and within the periphery of the sleeve 172. The blades can thus be changed.

The blades could be made with outwardly facing cutting edges, to sense a particular shaped recess or dimple in the can end wall, rather than a boss, or the blades could be spaced from the central axis to engage a properly shaped indicia on the can end wall. The sensed surface irregularity can be a dimple or recess extending inwardly into the interior of the container.

The indicia thus can be varied. If a single dimple or bump is placed on the can spaced from the can axis and the probe comprises a generally annular sensor concentric with (or centered on) a reference axis of the container, the rotational position of the container about its axis is not critical and rotationally orienting the can for sensing is not necessary either. Such a sensor ring could be an annular ring that tilted when it hit an identifying irregularity on an end wall of a can. Thus regardless of the rotational position of the can, as long as the irregularity was present the annular ring would be tilted to close a circuit to indicate presence of the can indicia. The centering of the container reference axis relative the probe can be accomplished by means which move transverse to the can axis, as well for example "V" blocks that engage the can side walls could be used.

What is claimed is:

1. In a container handling apparatus having means for providing for identifying a generally cylindrical container having a longitudinal central axis, and havng means for receiving and supporting each of the individual containers, the improvement comprising means for identifying containers as to a particular configuration or indicia, including first means operable to engage wall portions of a container on the means for receiving and supporting upon movement of the first means toward such container and to position the central axis of such container in known relation with respect to portions of said first means, probe means actuable in direction of the longitudinal axis of such container subsequent to the positioning of a container by the first means for identification of particular indicia on at least one of the ends of said container, and means responsive to the presence of indicia sensed by said probe means to provide a signal indicating the presence of said indicia.

2. The combination as specified in claim 1 wherein said probe means are carried by said first means and comprise a pair of probes, each of which is responsive to a particular configuration on the same end wall of a container.

3. The combination of claim 2 and means responsive to a preselected position of each of said pair of probes to complete an electrical circuit only when both probes are in a preselected position.

4. The combination as specified in claim 1 wherein said probe means comprise a movable member having an end portion, said end portion having two separate sections, the indicia to be sensed comprising an electrically conductive portion on the end wall of the container shaped so that it will engage both of said separate sections simultaneously, and said means responsive including means on said separate sections comprising portions of an electrical circuit whereby engagement of said conductive portion by both of said sections will complete an electrical circuit.

5. The combination as specified in claim 1 wherein said container has end wall peripheral rims and said first means comprises a pair of reciprocal first members slidably mounted on opposite sides of a container held on the means for receiving and supporting, said reciprocal first members operating simultaneously to move toward each other and engage each of the ends of a can supported on said means for receiving and supporting, said reciprocal first members facing opposite ends of a container on the means for receiving and supporting and having tapered walls which engage the rims of such container to axially center the container as the first members move toward each other.

6. The combination as specified in claim 5, said probe means being slidably mounted with respect to said first means, means to reciprocate said probe means, and bias means connected between said probe means and said first member to resiliently urge the first means toward a container supported on the said means for receiving and supporting.

7. The combination as specified in claim 6 wherein said means to reciprocate includes bell crank means, a tension link, means to create a tension on said tension link to move said bell crank means, and means to limit the amount of tension load that may be carried by said tension link.

8. A container disposing apparatus including a frame, means on the frame providing for sequential disposal of generally cylindrical containers having a longitudinal central axis and end walls transverse to the axis, container feeding means for feeding containers singularly and in succession, means to receive a container from the feeding means and to support a container with the axis of the container in a desired orientation, container centering means mounted adjacent opposite ends of a container supported in the means to receive and support, at least portions of said container centering means being movably mounted for reciprocal movement from position where the centering means are spaced from both ends of the container to position wherein the container centering means engage both of the opposite ends of said container, said container centering means having tapered surface portions which have a generally common central axis and which engage ends of said container and urge the container to position with the central axis of said container generally co-axial with respect to said common central axis of said tapered surface portions, probe means mounted within the periphery of the tapered surface portions of at least one of the container centering means, said probe means including means to identify presence of particular indicia on at least one of the ends of said container, and means responsive to the presence of indicia sensed by said probe means to provide a signal indicating the presence of said indicia.

9. The combination as specified in claim 8, wherein said probe means are movably mounted on the container centering means, and means to actuate said probe means to position adjacent said container subsequent to centering of the container by said centering means.

10. The combination of claim 8 wherein there are two of said container centering means and each include a housing, means on said frame slidably mounting said housing for reciprocal movement, and said probe means being slidably mounted relative to at least one of said housings.

11. The combination of claim 10 and means to reciprocally drive said probe means in reciprocal movement, spring means connected between said probe means and said one housing to cause said one housing to be resiliently moved by said spring means toward a container in said means to receive support.

12. The combination of claim 11 wherein said probe means comprise a pair of probes, each of said probes being slidably mounted on the interior of said sleeve and located at a known distance from the axis of said sleeve, bias means urging both of said probes to a first position, means on said sleeve engaging an end of a container centered in the respective centering means as the sleeve is driven by said means to reciprocally drive, said probes each being oriented to be moved from their respective first positions to second positions when the sleeve engages an end of a container and when the end of the container has a preselected configuration, said means responsive being actuable only when both of said probes move to their second positions.

13. The combination of claim 12 wherein said means responsive comprises circuit means including an electrical spring contactor engaging each probe, a contact member carried by each probe and making contact with said spring contactor on the respective probe only when the respective probe is in its second position.

14. The combination of claim 13 wherein said circuit means includes a switch external of said sleeve, means to make and break said switch only during the time the probes are in position to be sensing the desired indicia on a container held in the container centering means.

15. A container handling apparatus providing for identification of a container having a central reference axis as to presence of preselected indicia on the container comprising a raised surface irregularity on an end wall of the container positioned in a known relation to the central axis including a frame, means on the frame for receiving and supporting individual containers in sequence and oriented in a desired manner including first means to position the central axis of each container in a known relation with respect to said frame, and probe means on the frame actuable in direction to physically engage such container subsequent to the positioning of a container by the first means, one of said probe means and raised surface irregularity being concentric with and extending substantially annularly around the central axis of a container positioned by the first means, and means responsive to the presence of the predetermined raised surface irregularity on a container held in the first means and sensed by said probe means to provide a signal indicating the presence of said surface irregularity.

16. The combination as specified in claim 15 wherein the surface irregularity is a generally annular irregularity centered on the container central axis, and said probe means is carried by said first means and comprises a pair of probe sections, each of which forms a portion of an electrical circuit which is closed when the predetermined surface irregularity is sensed.

17. The combination of claim 16 wherein said probe means includes a single housing movable toward a surface irregularity of a container positioned by the first means, said housing having an opening facing a surface irregularity on a container positioned by the first means and said probe sections comprising knife blade means which will simultaneously engage a predetermined surface irregularity on a container positioned by the first means.

18. The combination of claim 15 wherein said first means includes at least one movable member movable in a direction along the central axis of a container to be identified and supported on said frame, said movable member including a tapered wall engagable with a container to be identified and urging the container to a desired position as the movable member moves.

19. The combination of claim 18 wherein said movable member is tubular and has an opening extending in direction of the central axis of a container to be identified and which is engaged by the movable member, said probe means being mounted in said movable member, said probe means comprising an elongated support, link means to actuate said elongated support in direction along the central axis of a container to be identified and a resilient connection between the elongated support and said movable member to resiliently urge the movable member to move with the elongated support.

20. The combination of claim 15 wherein said first means comprises at least one centering device which engages a container to be sensed and which upon movement in direction along the central axis of a container to be sensed tends to center such container relative to the centering device, a sleeve carrying said centering device and slidably mounted on said frame, said probe means being slidably mounted within said sleeve, second means on the frame to move said probe means relative to the sleeve and frame, and a resilient tension carrying connection between said probe means and said sleeve.

21. The combination of claim 20 wherein said probe means includes a rod member, an outer end of said rod member adjacent the container to be sensed being free to move transversely to said sleeve, a bushing having a part spherical outer surface within said sleeve and supporting the inner end of said rod member, said second means being connected to said bushing.

22. The combination of claim 21 wherein said outer end of said rod member carries means to engage a container to be identified, said outer end comprising a tapered surface which tends to center the outer end of the rod member on the surface irregularity of such container as the outer end is moved transversely to the sleeve.

23. A method of identifying a can or container having a longitudinal axis for determining whether a payout deposit should be made comprising providing on an end wall of such container an indicia positioned in known relation to the longitudinal axis, supporting said container with the longitudinal axis thereof in a known relation to a reference axis without indexing the rotational position of said container about its longitudinal axis, moving probe means in a direction along the longitudinal axis of such a container to a position adjacent portions of the end wall of said container to determine whether or not a desired indicia is present on the end wall of said container in said known location, providing a signal if said probe means senses the indicia and retracting said probe means to permit another container to be oriented with respect to said reference axis.

24. The method of claim 23 including the step of providing indicia concentric with said longitudinal axis and substantially continuously in an annular band relative thereto.

25. The method of claim 23 wherein said indicia comprises a nonplanar surface configuration of said end wall.

26. The method of claim 23 including the further step of centering said container relative to said reference axis by supporting it on at least one tapered wall on spaced points on the circumference of the container and adjacent to the outer edge of the container, and moving said tapered wall in a direction along the longitudinal axis of said container toward the center portions of said can on at least one end thereof prior to moving probe means toward the one end wall of the can.

27. Apparatus for handling a container having a longitudinal central axis and an end wall generally transverse to the longitudinal axis, said apparatus including means for sensing the presence of a preselected indicia on the end wall comprising a frame, means on the frame for receiving and supporting individual containers in sequence and oriented in a desired manner including first means to position a central axis of such a container in a known relation with respect to said frame, and probe means on the frame actuable in direction toward such container subsequent to the positioning of a container by the first means, said probe means including means to sense presence of preselected indicia on an end wall of a container positioned by the first means, and means responsive to the presence of the predetermined indicia on a container held in the first means and sensed by said probe means to provide a signal indicating the presence of said indicia.

28. The combination as specified in claim 27 wherein said probe means is supported by said first means and comprises means movable to engage the end wall of a container positioned by the first means, said means to sense being operable to sense a predetermined surface irregularity on an end wall of a container.

29. In a container handling apparatus having means for providing for identifying a generally cylindrical container having a central axis, and having means for receiving and supporting each of the individual containers, the improvement comprising means for identifying containers as to a particular indicia on the container generally symmetrical and centered on said central axis, including first means to engage a container on the means for receiving and supporting to position the central axis of such container in known relation with respect to portions of said first means, probe means actuable in direction of the central axis of such container subsequent to the positioning of a container by the first means for identification of indicia on at least one of the end of said container, means responsive to the presence of indicia sensed by said probe means to provide a signal indicating the presence of said indicia.

* * * * *

UNITED STATES PATENT OFFICE

CERTIFICATE OF CORRECTION

Patent No. 4,141,493 Dated February 27, 1979

Inventor(s) Ewald A. Arp

It is certified that error appears in the above-identified patent and that said Letters Patent are hereby corrected as shown below:

Column 17, line 57, (Claim 1, line 3), "havng" should be --having--. Column 19, line 28, (Claim 11, line 6), after "receive" insert --and--. Column 22, line 33, (Claim 29, line 15), "end" should be --ends--.

Signed and Sealed this

*Twenty-second* Day of *May 1979*

[SEAL]

*Attest:*

RUTH C. MASON
*Attesting Officer*

DONALD W. BANNER
*Commissioner of Patents and Trademarks*